United States Patent
Sonoda et al.

(10) Patent No.: US 7,639,331 B2
(45) Date of Patent: Dec. 29, 2009

(54) LIQUID CRYSTAL DISPLAY DEVICE

(75) Inventors: Daisuke Sonoda, Chiba (JP); Takahiro Ochiai, Chiba (JP); Yasukazu Kimura, Chiba (JP); Masahiro Maki, Mobara (JP); Toshio Miyazawa, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 433 days.

(21) Appl. No.: 11/586,541

(22) Filed: Oct. 26, 2006

(65) Prior Publication Data

US 2007/0097303 A1 May 3, 2007

(30) Foreign Application Priority Data

Oct. 27, 2005 (JP) .............................. 2005-312165

(51) Int. Cl.
*G02F 1/1333* (2006.01)
(52) U.S. Cl. ...................................... 349/122
(58) Field of Classification Search ................... 349/122
See application file for complete search history.

(56) References Cited

U.S. PATENT DOCUMENTS

| 5,585,951 | A  | 12/1996 | Noda et al. |
| 6,654,076 | B2 | 11/2003 | Ha et al. |
| 6,697,141 | B2 | 2/2004 | Yamakita et al. |
| 2001/0050745 | A1 | 12/2001 | Liu |
| 2004/0233359 | A1 | 11/2004 | Nam et al. |

FOREIGN PATENT DOCUMENTS

| JP | 06-242433 | 9/1994 |
| JP | 2000-267128 | 9/2000 |
| JP | 2001-154220 | 6/2001 |
| JP | 2002-023185 | 1/2002 |
| JP | 2002-328385 | 11/2002 |
| KR | 2002-0026369 | 4/2002 |
| KR | 2003-0010412 | 2/2003 |
| KR | 2003-0034855 | 5/2003 |
| KR | 2004-0100489 | 12/2004 |
| KR | 2005-0068442 | 7/2005 |

*Primary Examiner*—Sung H Pak
(74) *Attorney, Agent, or Firm*—Antonelli, Terry, Stout & Kraus, LLP

(57) ABSTRACT

A liquid crystal display device that includes a first substrate, a second substrate, and a liquid crystal material sandwiched between the first and second substrates. In the device, the first substrate includes an active element, a first insulation film formed above the active element, a first electrode formed above the first insulation film, a second insulation film formed above the first electrode, and a second electrode formed above the second insulation film. The second insulation film is a coating insulation film, the first insulation film has a first contact hole, the second insulation film is formed between the first and second electrodes, and inside of the first contact hole, the second insulation film formed inside of the first contact hole is formed with a second contact hole, the second electrode is a pixel electrode, the second electrode is electrically connected to the active element via the second contact hole, and a retention capacity is formed by the first and second electrodes and the second insulation film. The resulting liquid crystal display device of such a configuration causes no short circuit in a height-different portion between electrodes formed on both sides of an insulation film.

16 Claims, 9 Drawing Sheets

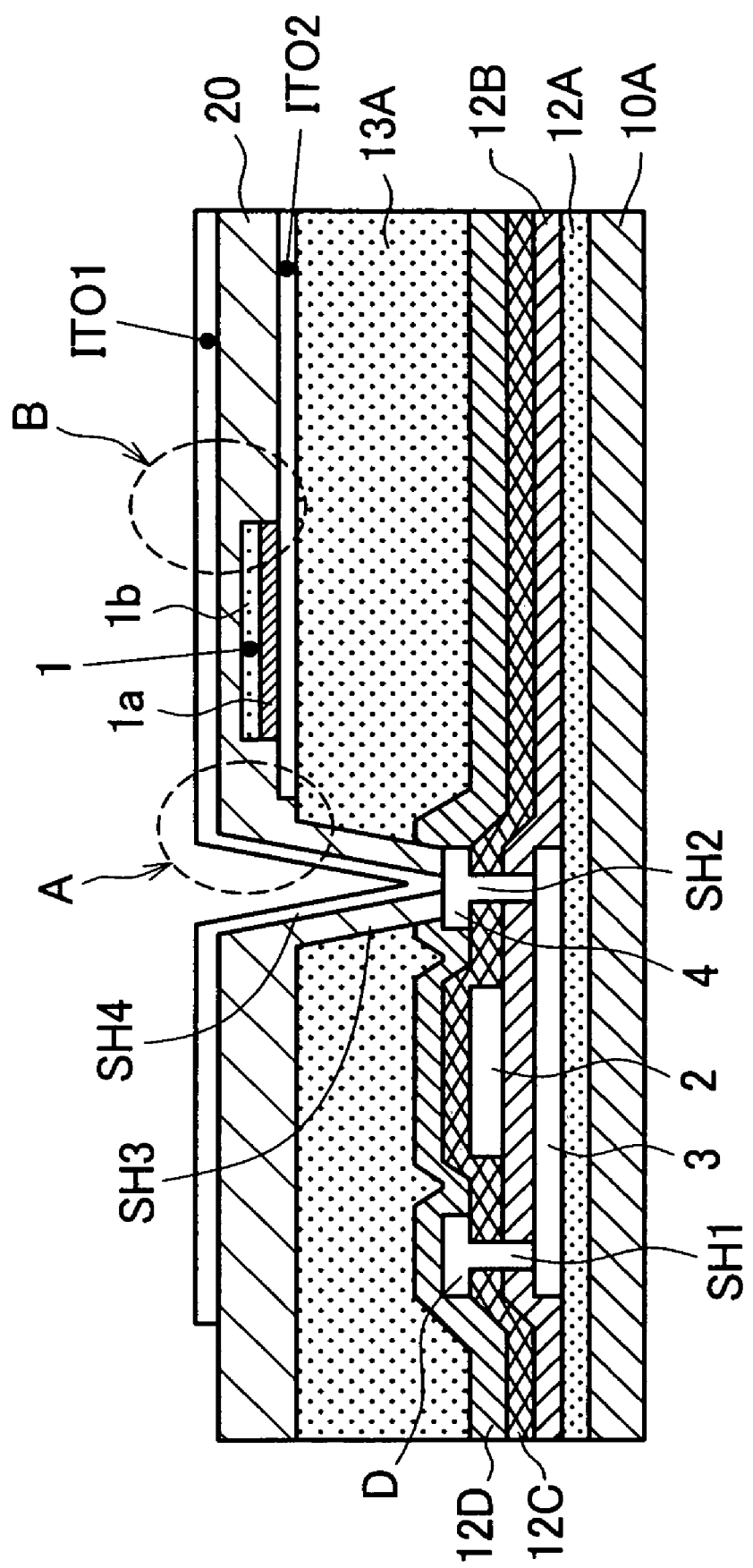

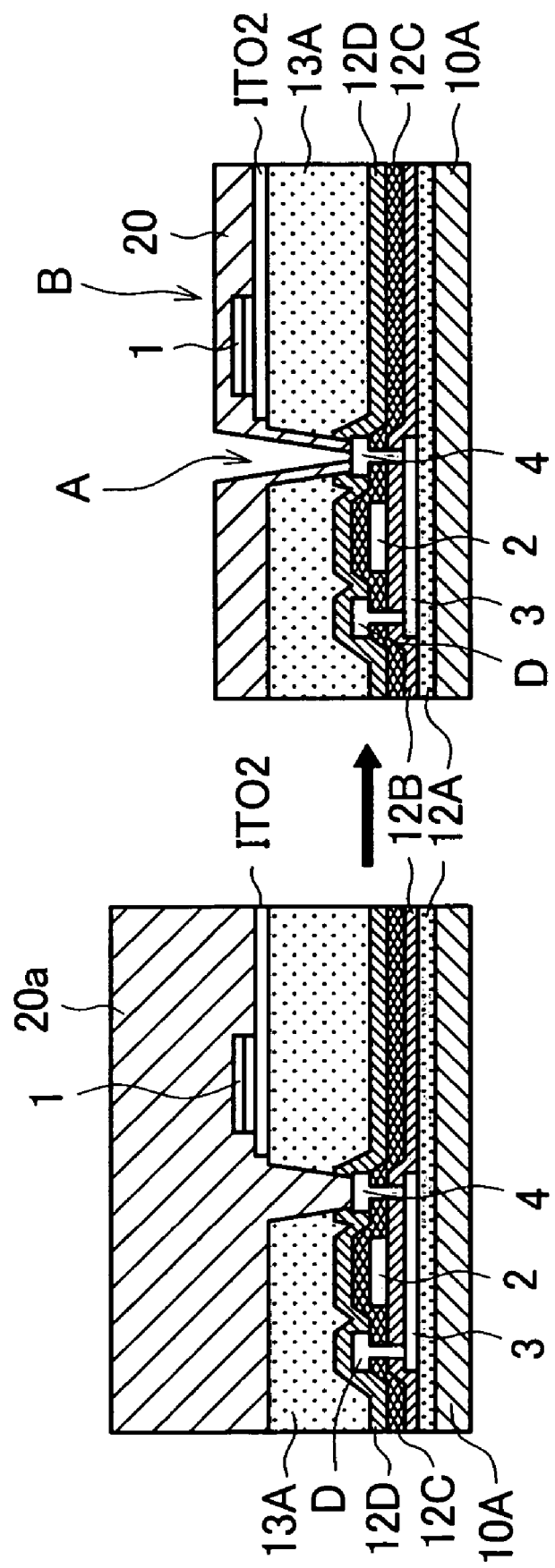

LIQUID CRYSTAL DISPLAY DEVICE

The present application claims priority from Japanese application JP2005-312165 filed on Oct. 27, 2005, the content of which is hereby incorporated by reference into this application.

BACKGROUND OF THE INVENTION

The present invention relates to liquid crystal display devices and, more specifically, to a technology working effectively when applied to a substrate formed with an active element, e.g., thin film transistor, of a liquid crystal display panel.

In an IPS (In-Plane Switching) (also referred to as horizontal-field-type) liquid crystal display panel, an electric field is generated between a pixel electrode and an opposing electrode to be parallel at least partially to a substrate. The electric field is used to drive a liquid crystal material, and light passing through a liquid crystal layer is modulated for image display.

Such an IPS liquid crystal display panel is known for displaying images by modulating light passing through a liquid crystal layer. That is, in the panel, a sheet-like opposing electrode and a partially-linear pixel electrode are formed with an insulation film therebetween. An electric field is then generated between the sheet-like opposing electrode and the partially-linear electrode, and thus generated electric field is used to drive the liquid crystal material so that light passing through a liquid crystal layer is modulated for image display.

As an exemplary related art of the invention, there is Patent Document 1 (JP-A-6-242433) although not about the IPS liquid crystal display panel.

SUMMARY OF THE INVENTION

With the above-described IPS liquid crystal display panel using a sheet-like opposing electrode, an insulation film formed between the sheet-like opposing electrode and a partially-linear pixel electrode is required to be thin in thickness of, e.g., about 100 nm to 500 nm. The panel is also required to be flat considering a possible problem of domain generation due to not enough rubbing treatment in the post processing.

As a measure therefor, an insulation film to be formed between the sheet-like opposing electrode and the partially-linear pixel electrode may be formed with a thin coating of a coating insulation film.

With this method, however, the thickness of the coated film becomes considerably thin in a through hole portion having a large height difference, e.g., 1 µm or larger. There is thus a possibility of causing a short circuit between the opposing electrode and the pixel electrode.

Advantages of the invention are to provide a liquid crystal display device having no possibility of causing a short circuit in a height-different portion between electrodes formed on both sides of an insulation film.

These and other advantages and new features of the invention will become apparent from the following detailed description of the invention when taken in conjunction with the accompanying drawings.

The typical main disclosure of the invention is summarized as below.

1. A liquid crystal display device that includes a first substrate, a second substrate, and a liquid crystal material sandwiched between the first and second substrates. In the device, the first substrate includes an active element, a first insulation film formed above the active element, a first electrode formed above the first insulation film, a second insulation film formed above the first electrode, and a second electrode formed above the second insulation film. The second insulation film is a coating insulation film, the first insulation film has a first contact hole, the second insulation film is formed between the first and second electrodes, and inside of the first contact hole, the second insulation film formed inside of the first contact hole is formed with a second contact hole, the second electrode is a pixel electrode, the second electrode is electrically connected to the active element via the second contact hole, and a retention capacity is formed by the first and second electrodes and the second insulation film.

2. According to 1, the second electrode is a transparent electrode.

3. According to either 1 or 2, the second insulation film has a thickness of 100 nm or more but 500 nm or less.

4. According to any one of 1 to 3, the first electrode is a transparent electrode.

5. According to any one of 1 to 3, the first electrode is a reflective electrode.

6. According to 5, the reflective electrode is shaped not flat.

7. According to any one of 1 to 3, the first electrode serves as a transparent electrode and a reflective electrode.

8. According to any one of 1 to 7, the first electrode is an opposing electrode, and the liquid crystal material is driven by an electric field to be generated by the first and second electrodes.

9. According to 8, the second electrode has a slit.

10. According to any one of 1 to 7, the second substrate has an opposing electrode, and the liquid crystal material is driven by an electric field to be generated by the opposing electrode and the second electrode.

11. According to any one of 1 to 10, a third insulation film is provided between the first and second electrodes.

12. According to any one of 1 to 11, the second insulation film has a flat surface.

Note here that the configurations of 1 to 12 are all just examples, and surely not restrictive.

The effects derived by any typical disclosure of the invention are summarized as below.

The liquid crystal display device of the invention enables to prevent short circuits in a height-different portion between electrodes formed on both sides of an insulation film.

BRIEF DESCRIPTION OF THE DRAWINGS

FIG. 4 is a cross sectional diagram showing the cross sectional configuration on the side of a transparent substrate (100A) cut along a line B-B' of FIG. 1;

FIGS. 6A and 6B are both a diagram for illustrating another exemplary method of forming the coating insulation later of FIG. 4;

DESCRIPTION OF THE PREFERRED EMBODIMENT

Figure 1:
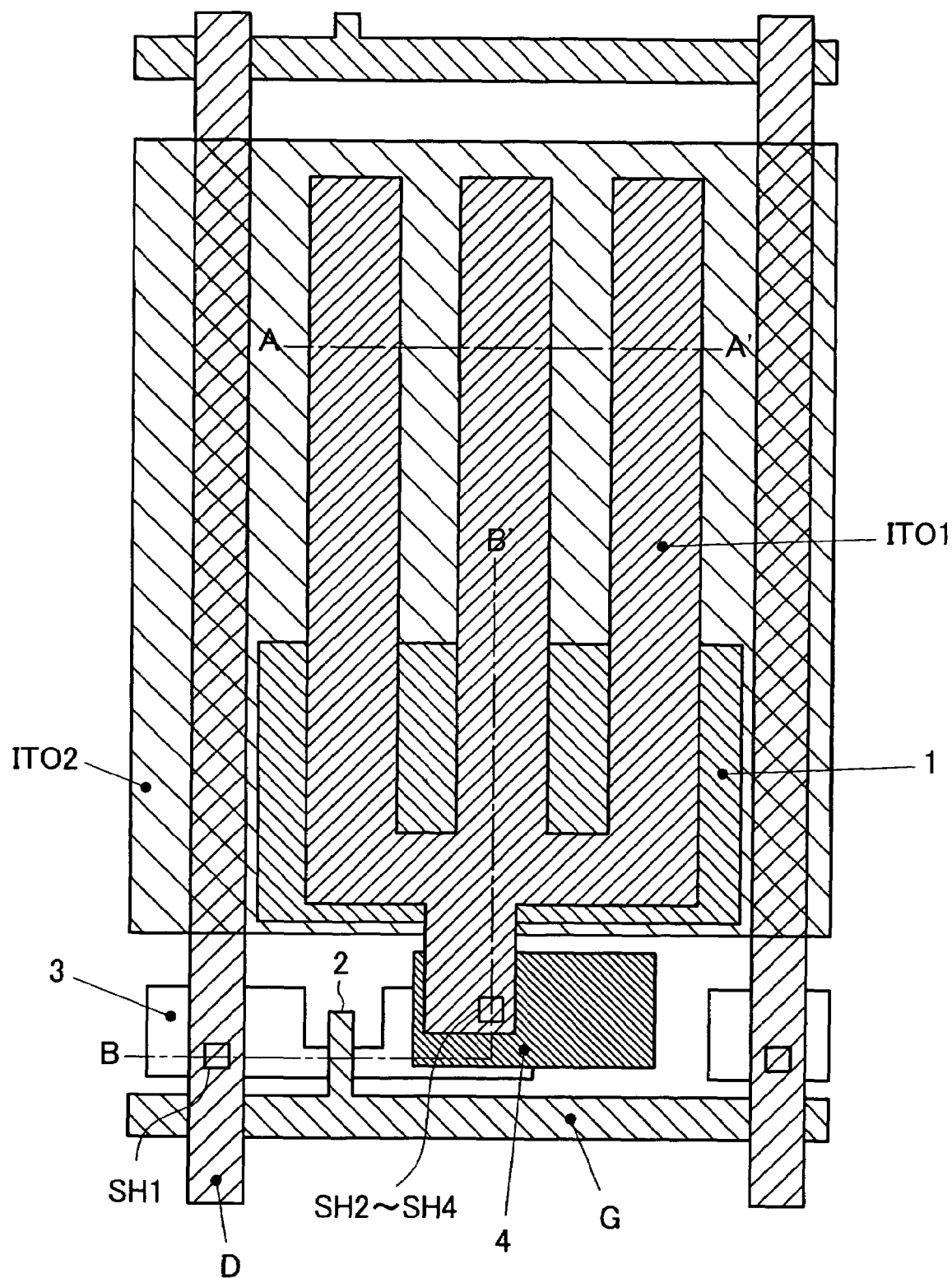
FIG. 1 is a plan view showing the configuration of a sub-pixel of a liquid crystal display panel in an embodiment of the invention.

In the below, an embodiment of the invention is described in detail by referring to the accompanying drawings.

Note that, in all of the diagrams for use for illustrating the embodiment, any component having the same function and capability is under the same reference numeral, and not described twice.

FIG. 1 is a plan view showing the configuration of a subpixel of a liquid crystal display panel in the embodiment of the invention.

Figure 2:
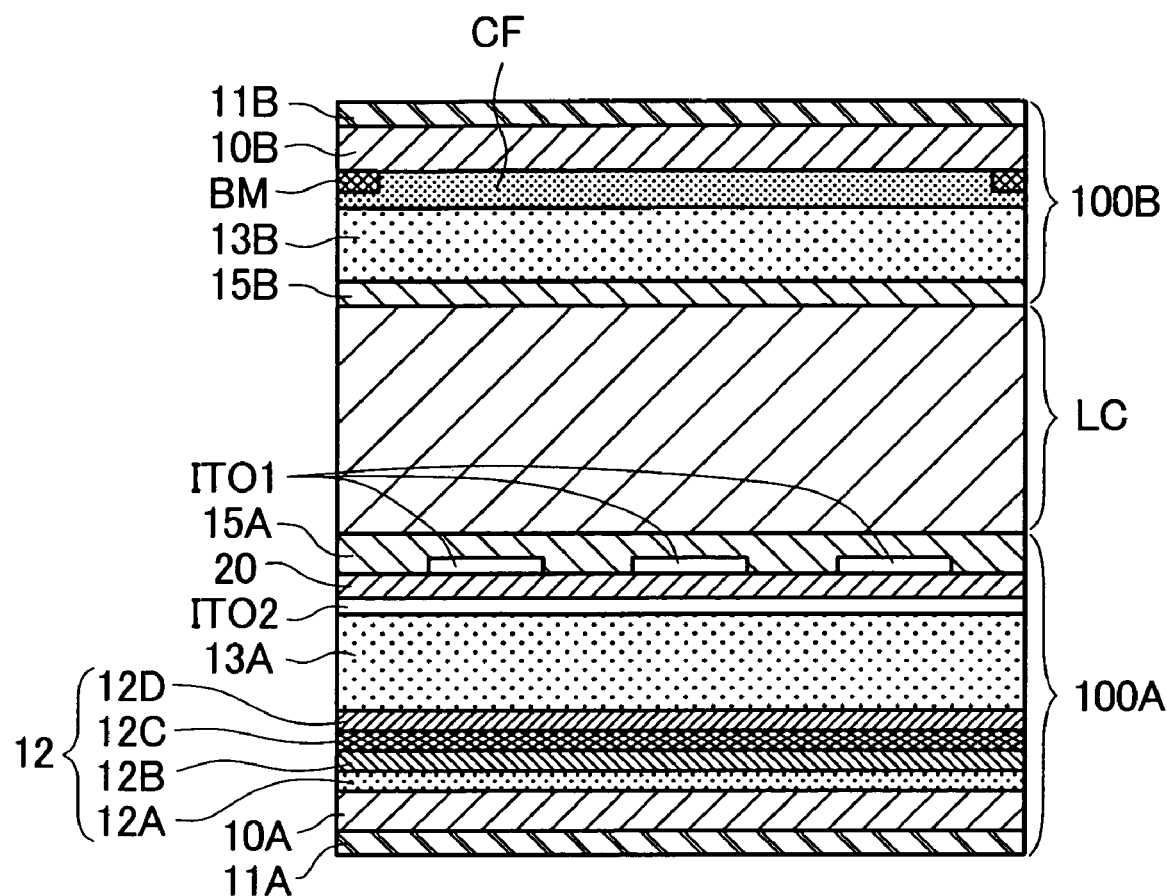
FIG. 2 is a cross sectional diagram showing the cross sectional configuration of a portion cut along a line A-A' of FIG. 1.

FIG. 2 is a cross sectional diagram showing the cross sectional configuration of a portion cut along a line A-A' of FIG. 1. In the below, by referring to FIG. 2, the configuration of the liquid crystal display panel in this embodiment is described.

The liquid crystal display panel of this embodiment is an IPS liquid crystal display panel using a sheet-like opposing electrode, and as shown in FIG. 2, includes a transparent substrate (100B) and another transparent substrate (100A). These transparent substrates are disposed to face each other with a liquid crystal layer LC disposed therebetween. In this embodiment, the main surface side of the transparent substrate (100B) is the viewer's side.

The transparent substrate (100B) has a glass substrate 10B, and on the side of the liquid crystal layer LC of the glass substrate 10B, various types of films and layers are formed in order from the glass substrate 10B toward the liquid crystal layer LC, i.e., a light tight film (BM), a color filter layer (CF), an overcoat layer 13B, and an orientation film 15B. On the outer side of the transparent substrate (100B), a polarizer 11B is formed.

The transparent substrate (100A) has a glass substrate 10A, and on the side of the liquid crystal layer LC of the glass substrate 10A, various types of films and electrodes are formed in order from the glass substrate 10A toward the liquid crystal layer LC, i.e., an insulation film 12, an interlayer insulation film 13A, a transparent electrode (ITO2) serving as an opposing electrode, a coating insulation film 20, a pixel electrode (ITO1), and a orientation film 15A. On the outer side of the transparent substrate (100A), a polarizer 11A is formed.

The insulation film 12 is configured by a base film 12A, a gate insulation film 12B, an interlayer insulation film 12C, and an interlayer insulation film 12D.

Referring back to FIG. 1, a reference character D denotes a video line (also referred to as drain or source line), G denotes a scan line (also referred to as gate line), and SH1 to SH4 each denote a through hole (also referred to as contact hole). A reference numeral 1 denotes a reflective electrode, 2 denotes a gate electrode, 3 denotes a semiconductor layer, and 4 denotes a source electrode (also referred to as drain electrode when the video line D is referred to as source line).

In this example, the reflective electrode 1 is of two-layer configuration, e.g., a lower layer of molybdenum (Mo) (1a) and an upper layer of aluminum (Al) (1b).

Figure 3:
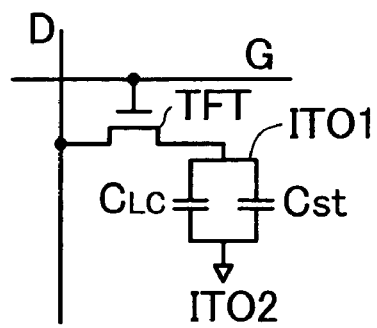
FIG. 3 is a diagram showing an equivalent circuit of FIG. 1.

FIG. 3 is a diagram showing an equivalent circuit of FIG. 1, and a capacitor element (CLC) of FIG. 3 denotes the volume of a liquid crystal material, and a capacitor element (Cst) denotes a retention capacity (also referred to as storage capacity). The retention capacity is formed of a pixel electrode (ITO1) and a transparent electrode (ITO2) serving as an opposing electrode having a coating insulation film 20 sandwiched therebetween.

In a liquid crystal display panel that is put into practical use, when the equivalent circuit of FIG. 1 is a color liquid crystal display panel for use for a mobile phone, for example, the panel includes subpixels of about 240×320×3 arranged in matrix. The liquid crystal display device of the embodiment is driven similarly to an IPS liquid crystal display device, and thus no description is given here about the drive method.

The liquid crystal display panel of the embodiment is semi-transmissive, and an area formed with the reflective electrode 1 configures a reflective liquid crystal display panel, and the remaining area configures a transmissive liquid crystal display panel.

Described now is the configuration of a portion of a thin film transistor of FIG. 1.

FIG. 4 is a cross sectional diagram showing the cross sectional configuration on the side of a transparent substrate (100A) cut along a line B-B' of FIG. 1. Note that the polarizer 11A is not shown in FIGS. 4, 5A to 5C, 6A and 6B, 7, 9, 13, and 14, which will be described later.

As shown in FIG. 4, the semiconductor layer 3 is formed on the base layer 12A, which is formed on the glass substrate 10A. The base layer 12A is a multilayer of SiN (silicon nitride) and $SiO_2$ (silicon dioxide), for example. The semiconductor layer 3 is configured by an amorphous silicon film or a polysilicon film.

Such a semiconductor layer 3 is formed thereon with the gate insulation film 12B of $SiO_2$, for example, and on this gate insulation film 12B, the gate electrode 2 is formed.

The gate electrode 2 is formed thereon with the interlayer insulation film 12C of $SiO_2$, SiN, or others, and on this interlayer insulation film 12C, a video line (D) and the source electrode 4 are formed. The semiconductor layer 3 is connected to the video line (D) via a through hole (SH1), and is also connected to the source electrode 4 via another through hole (SH2).

On the video line (D) and the source electrode 4, the interlayer insulation film 12D of $SiO_2$, SiN, or others, is formed, and the interlayer insulation film 12D is formed thereon with an interlayer insulation film 13A of acrylic resin, for example.

On the source electrode 4, a through hole (SH3) is formed to the interlayer insulation films 12D and 13A.

In this embodiment, the through hole (SH3) is also formed therein with the coating insulation film 20. The coating insulation film 20 formed inside of the through hole (SH3) is formed with a through hole (SH4). The through hole (SH4) is formed therein with a transparent conductive film, e.g., ITO; Indium-Tin-Oxide, whereby the pixel electrode (ITO1) is electrically connected to the source electrode 4.

As such, the pixel electrode (ITO1) is electrically connected to the active elements formed to the pixels. Via the active elements driven by the scan line (G), the pixel electrode (ITO1) is written with video signals coming over the video line (D).

Described below is a method of forming the coating insulation film 20 of FIG. 4.

Figure 5A:
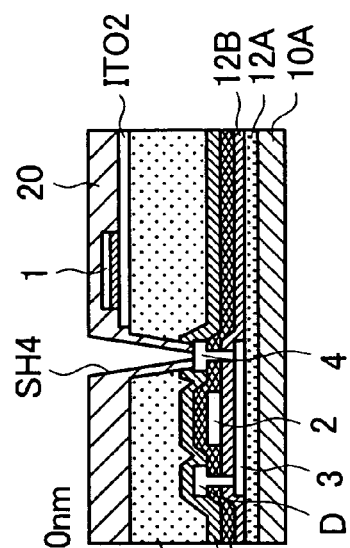
FIGS. 5A to 5C are all a diagram for illustrating an exemplary method of forming a coating insulation film of FIG. 4.
Figure 5B:
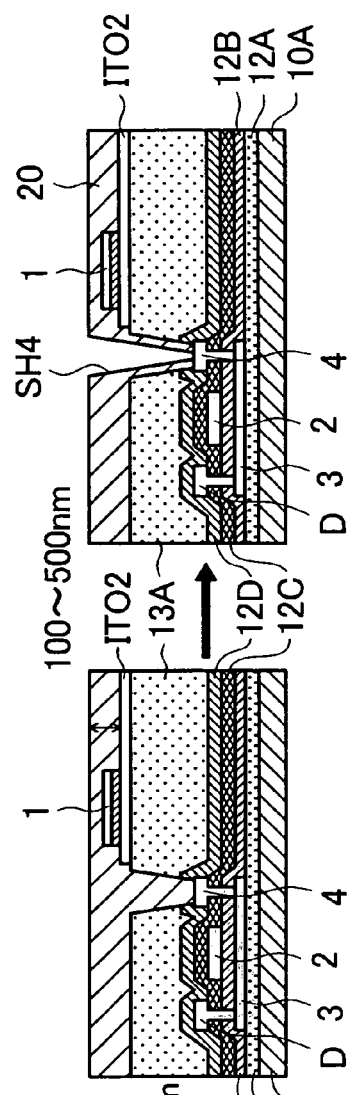
Figure 5C:
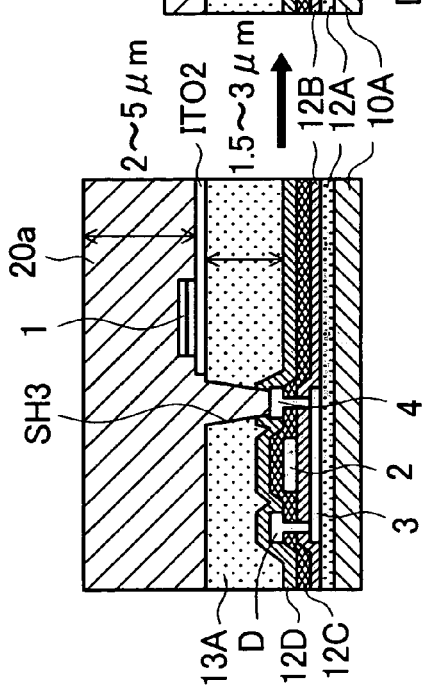

FIGS. 5A to 5C are all a diagram for illustrating an exemplary method of forming the coating insulation film 20 of FIG. 4.

First of all, as shown in FIG. 5A, the glass substrate 10A is formed thereon with various types of films, layers, and electrodes by a common method, i.e., the base film 12A, the semiconductor layer 3, the gate insulation film 12B, the gate electrode 2, the interlayer insulation film 12C, the video line (D), the source electrode 4, the interlayer insulation film 12D, and the interlayer insulation film 13A. Thereafter, on the source electrode 4, the through hole (SH3) is formed to the interlayer insulation films 12D and 13A. Furthermore, the transparent electrode (ITO2) and the reflective electrode 1 which function as the opposing electrode are formed. A coating insulation material 20a is then disposed with a thickness of 2 to 5 μm, for example. Note here that the interlayer insulation film 13A has the thickness of 1.5 to 3 μm, for example.

Next, as shown in FIG. 5B, the coating insulation material 20a is made thin to be 100 to 500 nm in thickness, for example.

When the coating insulation material 20a is made thin as such, the material may be subjected to developing treatment with no light exposure or made thin by ashing treatment if it is photosensitive, and if not photosensitive, the material may be entirely subjected to etching treatment.

Thereafter, as shown in FIG. 5C, the through hole (SH4) is formed so that the coating insulation film 20 is formed.

When the coating insulation material 20a is photosensitive, the through hole (SH4) can be formed by light exposure and developing treatment, and when the material is not photosensitive, the through hole may be made by photo etching.

FIGS. 6A and 6B are both a diagram for illustrating another exemplary method of forming the coating insulation film 20 of FIG. 4.

First of all, as shown in FIG. 6A, the glass substrate 10A is formed thereon with various types of films, layers, and electrodes by a common method, i.e., the base film 12A, the semiconductor layer 3, the gate insulation film 12B, the gate electrode 2, the interlayer insulation film 12C, the video line (D), the source electrode 4, the interlayer insulation film 12D, and the interlayer insulation film 13A. Thereafter, on the source electrode 4, the through hole (SH3) is formed to the interlayer insulation films 12D and 13A. Furthermore, the transparent electrode (ITO2) and the reflective electrode 1 which function as the opposing electrode are formed. The photosensitive coating insulation material 20a is then disposed with a thickness of 2 to 5 μm, for example.

Next, as shown in FIG. 6B, with the technique of half exposure, a portion of the through hole (SH4), i.e., a portion indicated by an arrow A of FIG. 6B, is fully exposed to light, and the remaining portion, i.e., portion indicated by an arrow B of FIG. 6B, is subjected to half exposure. Through developing treatment, formed thereby is the coating insulation film 20 having the thickness of 100 to 500 nm, for example, with the through hole (SH4) formed thereto.

With the developing treatment with no light exposure, when the photosensitive coating insulation material 20a in use is much reduced in thickness, i.e., the degree of film thickness reduction is high, in the state of FIG. 6B, the material may be subjected to normal light exposure and developing treatment instead of half exposure.

Figure 7:
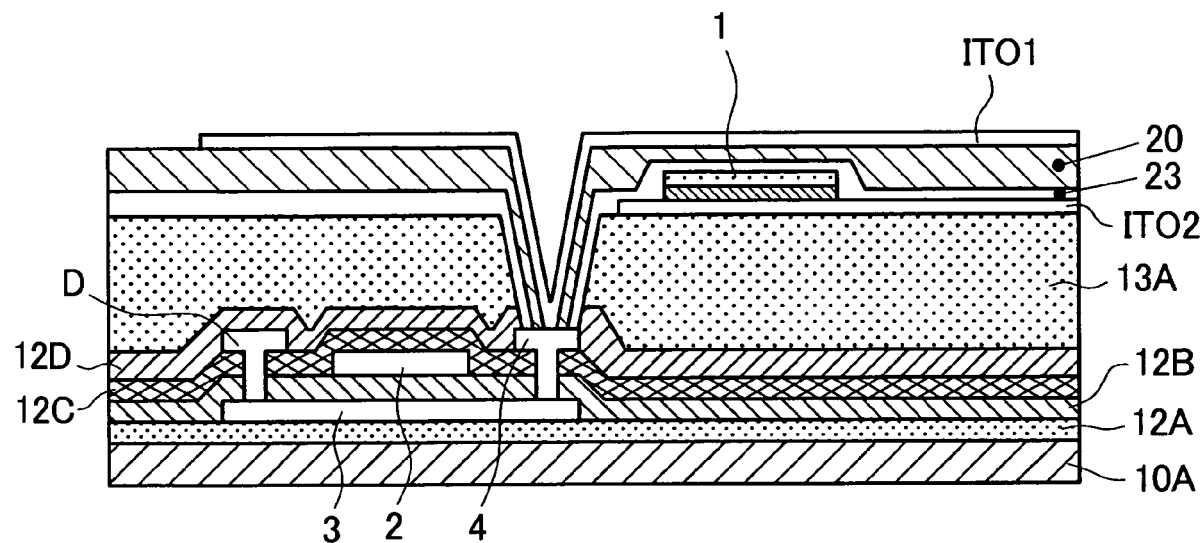
FIG. 7 is a cross sectional diagram showing the cross sectional configuration on the side of a transparent substrate (100A) in a modified example of the liquid crystal display panel in the embodiment of the invention.

FIG. 7 is a cross sectional diagram showing the cross sectional configuration on the side of a transparent substrate (100A) in a modified example of the liquid crystal display panel in the embodiment. FIG. 7 shows the cross sectional configuration of a portion cut along a line B-B' of FIG. 1.

FIG. 7 shows the configuration in which an insulation film 23 is formed by a CVD method on the transparent electrode (ITO2) serving as an opposing electrode and the reflective electrode 1, and on thus formed insulation film 23, the coating insulation film 20 is formed.

Note that, alternatively, the insulation film 23 may be formed between the coating insulation film 20 and the pixel electrode (ITO1).

Figure 13:
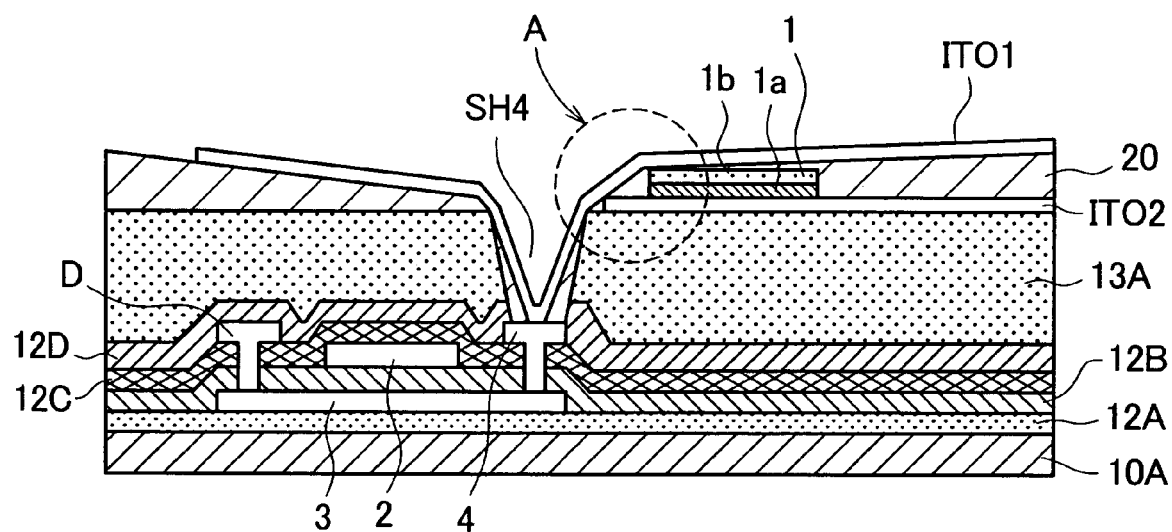
FIG. 13 is a diagram for illustrating an exemplary method of forming a coating insulation film 20, in which a coating insulation material is coated thin.

FIG. 13 is a diagram for illustrating an exemplary method of forming the coating insulation film 20, in which a coating insulation material is coated thin. When a coating insulation material is applied thin to form the coating insulation film 20, as indicated by A of FIG. 13, the resulting coating insulation film 20 becomes thick in the area of the through hole (SH4). This may cause a short circuit between the transparent electrode (ITO2) serving as an opposing electrode and the pixel electrode (ITO1). As such, when the coating insulation material is applied thin to form the coating insulation film, the surface of the resulting coating insulation film 20 may not be sufficiently flat in the area around the through hole (SH4). Herein, not to cause a short circuit, the opposing electrode may not be formed around the through hole (SH4). With this being the case, however, the area available for display is reduced, and the aperture ratio is reduced. There is also a problem of reducing the retention capacity.

On the other hand, in this embodiment, as indicated by A of FIG. 4, the coating insulation film 20 is sufficiently thick in the area of the through hole (SH4). Accordingly, the surface of the insulation film is flat and offers good coverage, and there is no possibility of causing a short circuit between the transparent electrode (ITO2) serving as an opposing electrode and the pixel electrode (ITO1). As such, the area in the vicinity of the through hole (SH4) can be formed with an opposing electrode.

Note here that the thicknesses of the interlayer insulation film 13A, the coating insulation material 20a, and the coating insulation film 20 are all just examples, and the exemplified value range is not restrictive. When the interlayer insulation film 13A has the thickness more than twice that of the coating insulation film 20, as described by referring to FIG. 13, there is a possibility that coating of the coating insulation material 20a over the area thinly around the height-different portion is not sufficient for surface flatness. Therefore, the film formation is desirably made by the process of FIGS. 5A to 5C and 6A to 6B.

Figure 14:
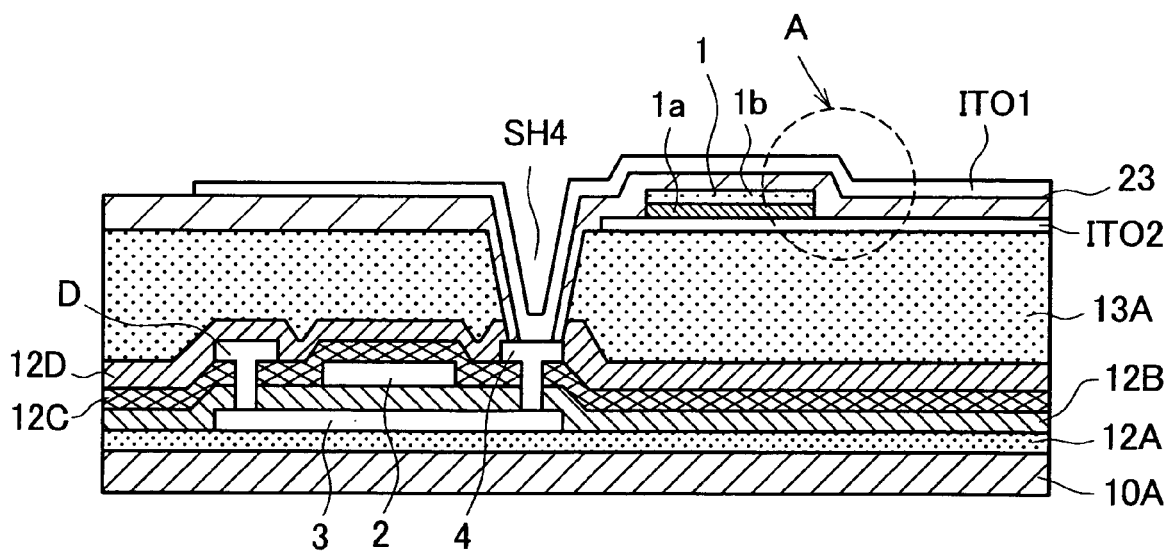
FIG. 14 is a diagram for illustrating an exemplary case of insulating between an opposing electrode and a pixel electrode (ITO1) with an insulation film formed over a transparent electrode (ITO2) serving as the opposing electrode and a reflective electrode 1 by a CVD (Chemical-Vapor Deposition) method.

FIG. 14 is a diagram for illustrating an exemplary case of insulating between an opposing electrode and a pixel electrode (ITO1) with the insulation film 23 formed over a transparent electrode (ITO2) serving as an opposing electrode and a reflective electrode 1 by a CVD method.

In such an exemplary case, as indicated by A of FIG. 14, the reflective electrode 1 cannot be made flat, thereby resulting in not enough rubbing treatment. This thus leads to domain generation, and the contrast is resultantly reduced.

On the other hand, in this embodiment, as indicated by B of FIG. 4, the height difference of the reflective electrode 1 can be absorbed so that the surface of the coating insulation film 20 can be made flat. This favorably prevents domain generation that is often caused by not enough rubbing treatment so that the contrast can be increased.

Although the above-described Patent Document 1 describes the liquid crystal display panel having a flattening film (210), there is no description about using the coating insulation film 20 to form the retention capacity.

Figure 8:
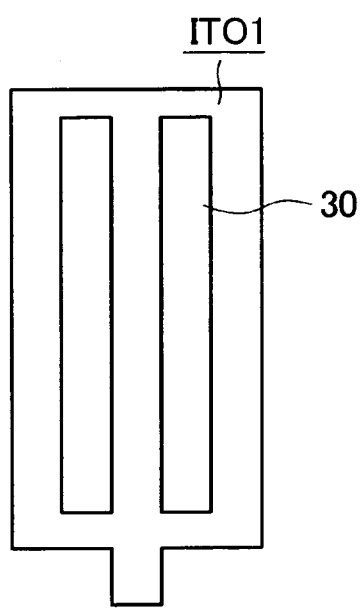
FIG. 8 is a diagram showing a modified example of a pixel electrode.

In this embodiment, the pixel electrode (ITO1) is not necessarily formed like a comb having slits with an open portion as shown in FIG. 1. Alternatively, the pixel electrode may be shaped rectangular carrying therein closed slits 30 as shown in FIG. 8. In the configurations of FIGS. 1 and 8, a part of the pixel electrode is linear.

Figure 9:
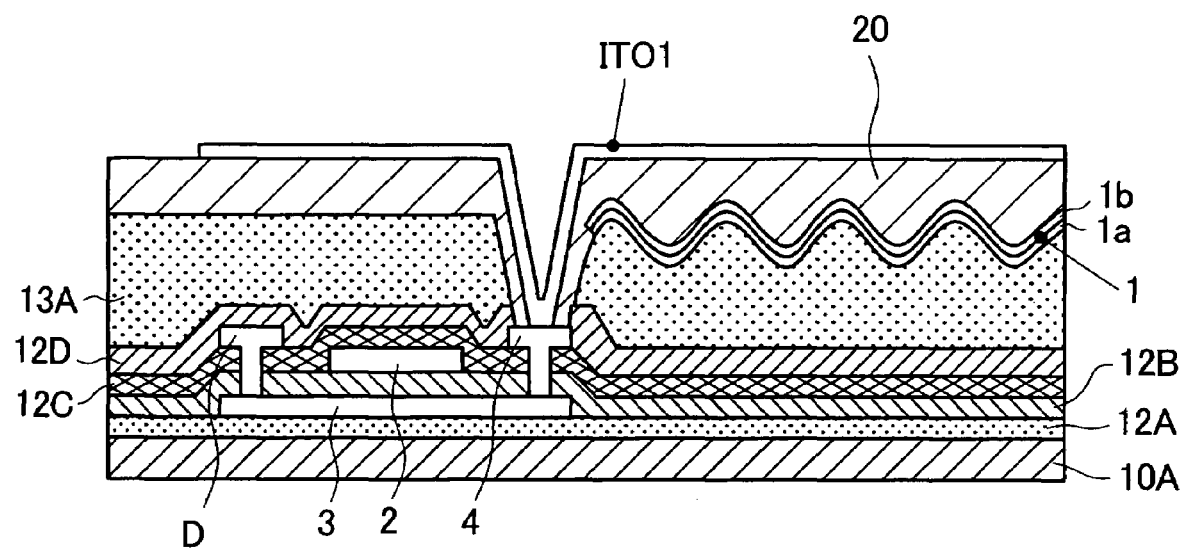
FIG. 9 is another cross sectional diagram showing the cross sectional configuration on the side of the transparent substrate (100A) in the modified example of the liquid crystal display panel in the embodiment of the invention.

FIG. 9 is another cross sectional diagram showing the cross sectional configuration on the side of the transparent substrate (100A) in the modified example of the liquid crystal display panel in the embodiment of the invention. FIG. 9 shows the cross sectional configuration of a portion cut along a line B-B' of FIG. 1.

FIG. 9 shows the configuration in which the reflective electrode 1 is not formed flat for the purpose of diffusing and reflecting light entering the reflective electrode 1. Also with such a configuration, the non-flatness of the reflective electrode 1 can be absorbed, and the surface of the coating insulation film 20 can be made flat.

Note that, although the configuration of FIG. 9 shows no opposing electrode, an opposing electrode is formed on the side of the transparent substrate (100A) in the case of a normal IPS liquid crystal display panel, and on the side of the transparent substrate (100B) in the case of a vertical-field-type liquid crystal display panel, e.g., TN (Twisted Nematic) or VA (Vertically Aligned) liquid crystal display panel. Alternatively, in the case of the IPS liquid crystal display panel, the reflective electrode 1 may serve also as an opposing electrode.

As such, the invention is not restrictive to an IPS liquid crystal display panel using a sheet-like opposing electrode, and is surely applicable to a common IPS liquid crystal display panel or a vertical-field-type liquid crystal display panel.

With this being the case, the transparent electrode (ITO2) or the reflective electrode 1 is used as an electrode for forming the retention capacity (Cst) between the transparent electrode (ITO2) or the reflective electrode 1 and the pixel electrode (ITO1).

In the case of a vertical-field-type liquid crystal display panel, the pixel electrode (ITO1) is not necessarily formed with slits, or may be formed with slits for multidomain.

Figure 10:
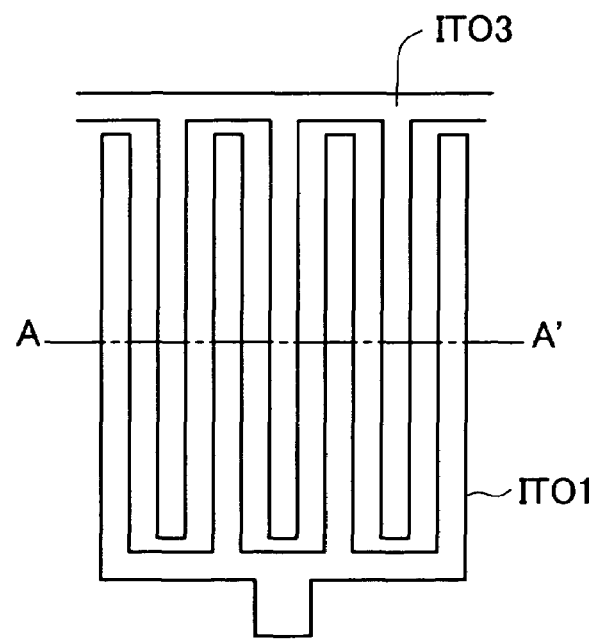
FIG. 10 is a plan view showing the configuration of a subpixel in a modified example of the liquid crystal display panel of the embodiment of the invention.

FIG. 10 is a plan view showing the configuration of a subpixel in a modified example of the liquid crystal display panel of the embodiment of the invention.

Figure 11:
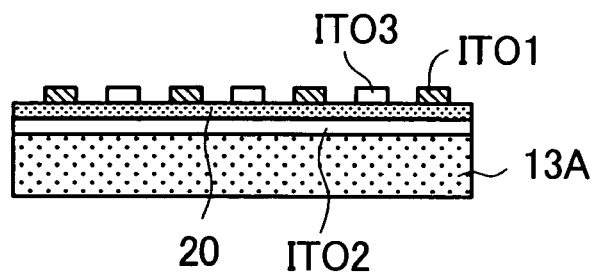
FIG. 11 is a cross sectional diagram showing the cross sectional configuration of a portion cut along a line A-A' of FIG. 10.

FIG. 11 is a cross sectional diagram showing the cross sectional configuration of a portion cut along a line A-A' of FIG. 10.

FIGS. 10 and 11 both show the configuration in which the invention is applied to a normal IPS liquid crystal display panel.

In FIGS. 10 and 11, ITO3 denotes an opposing electrode. In FIG. 11, on the lower layer side of the transparent electrode (ITO2), the configuration of the interlayer insulation film 13 is only shown. Also in FIG. 10, the transparent electrode (ITO2) serves as an opposing electrode, and works to form the retention capacity.

Figure 12:
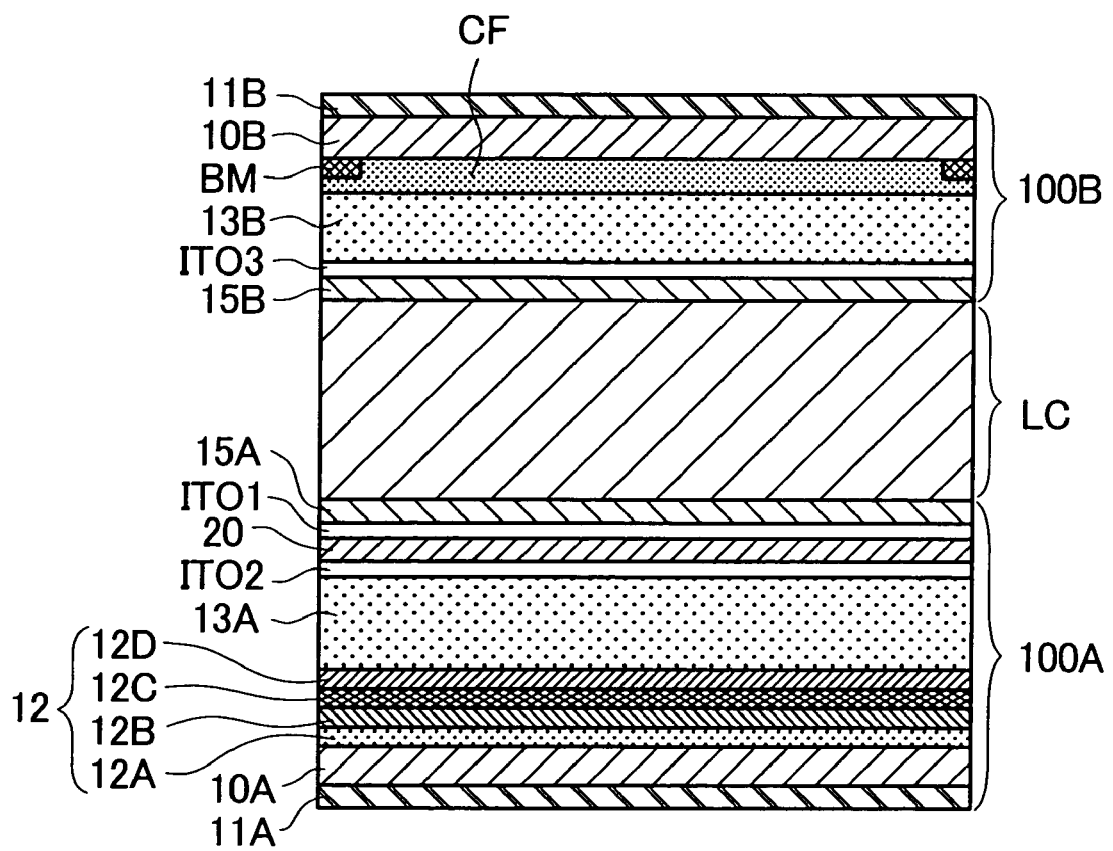
FIG. 12 is a cross sectional diagram showing the cross sectional configuration of a modified example of the liquid crystal display panel in the embodiment of the invention.

FIG. 12 is a cross sectional diagram showing the cross sectional configuration of a modified example of the liquid crystal display panel in the embodiment of the invention. FIG. 12 shows the cross sectional configuration of a portion cut along a line A-A' of FIG. 1.

The configuration of FIG. 12 is of the case where the invention is applied to a vertical-field-type liquid crystal display panel.

With a vertical-field-type liquid crystal display panel, an opposing electrode (also referred to as common electrode) (ITO3) is formed on the side of the transparent substrate (100B). The transparent electrode (ITO2) works to form the retention capacity. Through combination with the configuration of FIG. 9, the reflective electrode 1 may be formed.

While the invention proposed by the inventors has been described in detail based on the embodiments, the foregoing description is in all aspects illustrative and not restrictive. It is understood that numerous other modifications and variations can be devised without departing from the scope of the invention.

The invention may be applied not only to a semi-transmissive liquid crystal display device but also to a transmissive or reflective liquid crystal display device. In the case of a transmissive liquid crystal display device, the reflective electrode 1 is not necessarily provided. In the case of a reflective liquid crystal display device, the reflective electrode 1 may be formed as an alternative to the transparent electrode (ITO2).

In the case of a transmissive or semi-transmissive liquid crystal display device, a backlight unit (not shown) may be provided to the rear surface of a liquid crystal display panel. In the case of a reflective liquid crystal display device, a front light (not shown) may be provided on the front surface of a liquid crystal display panel (on the viewer's side).

The invention is applicable not only to liquid crystal display panels but also to display devices including an active element and the retention capacity.

What is claimed is:

1. A liquid crystal display device including a first substrate, a second substrate, and a liquid crystal material sandwiched between the first and second substrates, wherein
    the first substrate includes an active element, a first insulation film formed above the active element, a first electrode formed above the first insulation film, a second insulation film formed above the first electrode, and a second electrode formed above the second insulation film,
    the second insulation film is a coating insulation film,
    the first insulation film has a first contact hole,
    the second insulation film is formed between the first and second electrodes, and inside of the first contact hole,
    the second insulation film formed inside of the first contact hole is formed with a second contact hole,
    the second insulation film has a thickness of at least 100 nm and no greater than 500 nm at a first region where the second electrode is superposed and at a second region around the second contact hole,
    the second electrode is a pixel electrode,
    the second electrode is electrically connected to the active element via the second contact hole, and
    a retention capacity is formed by the first and second electrodes and the second insulation film.

2. The liquid crystal display device according to claim 1, wherein
    the second electrode is a transparent electrode.

3. The liquid crystal display device according to claim 1, wherein
    the first electrode is a transparent electrode.

4. The liquid crystal display device according to claim 1, wherein
    the first electrode is a reflective electrode.

5. The liquid crystal display device according to claim 4, wherein
the reflective electrode is shaped not flat.

6. The liquid crystal display device according to claim 1, wherein
the first electrode serves as a transparent electrode and a reflective electrode.

7. The liquid crystal display device according to claim 1, wherein
the first electrode is an opposing electrode, and the liquid crystal material is driven by an electric field to be generated by the first and second electrodes.

8. The liquid crystal display device according to claim 7, wherein the second electrode has a slit.

9. The liquid crystal display device according to claim 1, wherein
the second substrate has an opposing electrode, and the liquid crystal material is driven by an electric field to be generated by the opposing electrode and the second electrode.

10. The liquid crystal display device according to claim 1, wherein
a third insulation film is provided between the first and second electrodes.

11. The liquid crystal display device according to claim 1, wherein
the second insulation film has a flat surface.

12. The liquid crystal display device according to claim 1, wherein
the second insulation film is initially disposed with a first thickness and thereafter is made thin to be a second thickness which is thinner than the first thickness, the second thickness being 100 to 500 nm in thickness at the first region where the second electrode is superposed and at the second region around the second contact hole.

13. The liquid crystal display device according to claim 1, wherein
the second insulation film is made thin so as to have a thickness in a range of 100 to 500 nm by developing treatment with no light exposure at the first region and the second region.

14. The liquid crystal display device according to claim 1, wherein
the second insulation film is made thin so as to have a thickness in a range of 100 to 500 nm by ashing treatment at the first region and at the second region.

15. The liquid crystal display device according to claim 1, wherein
the second insulation film is made thin so as to have a thickness in a range of 100 to 500 nm by etching treatment at the first region and at the second region.

16. The liquid crystal display device according to claim 1, wherein
the second insulation film is made thin so as to have a thickness in a range of 100 to 500 nm by a technique of half exposure at the first region and at the second region.

* * * * *